United States Patent [19]

Sundblom

[11] Patent Number: 4,721,133

[45] Date of Patent: Jan. 26, 1988

[54] MULTIPLE USE VALVING DEVICE

[75] Inventor: Leif J. Sundblom, Castro Valley, Calif.

[73] Assignee: Alcon Laboratories, Inc., Fort Worth, Tex.

[21] Appl. No.: 946,675

[22] Filed: Dec. 31, 1986

Related U.S. Application Data

[63] Continuation of Ser. No. 781,129, Sep. 26, 1985, abandoned.

[51] Int. Cl.⁴ .............................................. F16K 11/22
[52] U.S. Cl. .................................. 137/883; 251/61.1; 251/262; 128/30
[58] Field of Search .................. 251/6, 61.1, 262; 137/883; 128/30

[56] References Cited

U.S. PATENT DOCUMENTS

| | | | |
|---|---|---|---|
| 2,211,167 | 8/1940 | Safford | 251/262 |
| 2,660,395 | 11/1953 | Mair et al. | 251/6 |
| 3,019,815 | 2/1962 | Lenardon et al. | 137/883 |
| 3,516,638 | 6/1970 | Piggott | 137/883 X |
| 3,613,729 | 10/1971 | Dora | 137/624.18 |
| 3,850,265 | 11/1974 | Bilwer et al. | 251/61.1 X |
| 4,223,813 | 9/1980 | Garrett et al. | 251/61.1 X |
| 4,274,411 | 6/1981 | Dotson, Jr. | 604/30 |
| 4,493,695 | 1/1985 | Cook | 604/30 |

*Primary Examiner*—A. Michael Chambers
*Assistant Examiner*—John C. Fox

[57] ABSTRACT

A multiple use valving device for use between a fluid flow source and at least one device utilizing the fluid flow including a valve housing having at least one inlet and one outlet connected in fluid communication by a channel therebetween. A deformable but resilient sealing member is positioned within the housing with respect to the channel so that when a manual control member is moved from an open to a closed position, an actuator responsive to the manual control member deforms the sealing member to block the channel to prevent any fluid transmission. By moving the manual control member back to an open position, the actuator is released and the resiliency of the sealing member pushes it away thereby opening the channel for fluid transmission. The valving device can consist of as few as one inlet, one channel and one outlet, or may consist of any variation of inputs and outputs, such as one inlet and a plurality of outlets each having its own channel in communication with the inlet and each having its own manual control member and actuator. Additionally, there can be two or more inlets each having any number of outlets and corresponding channels according to desire or need.

13 Claims, 6 Drawing Figures

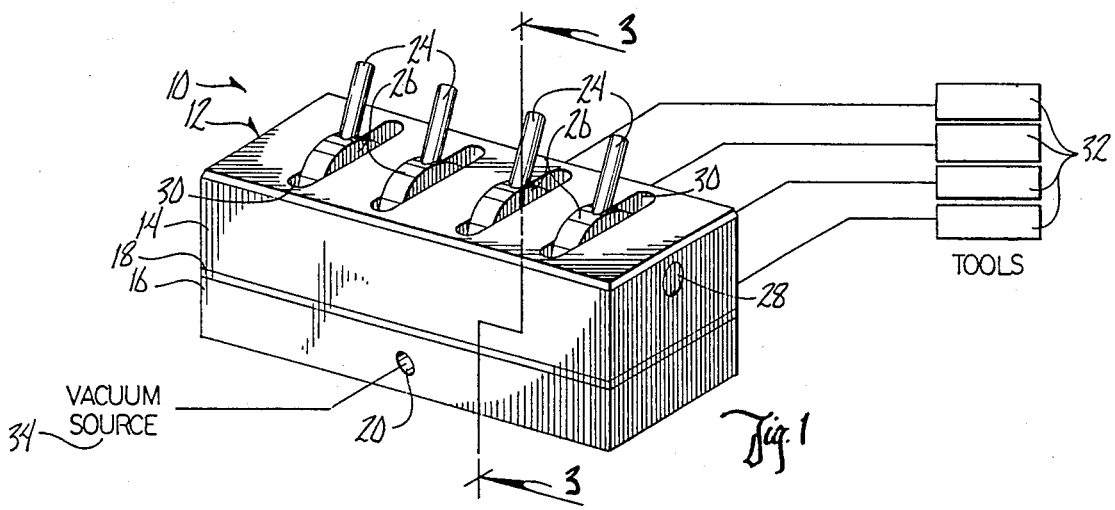
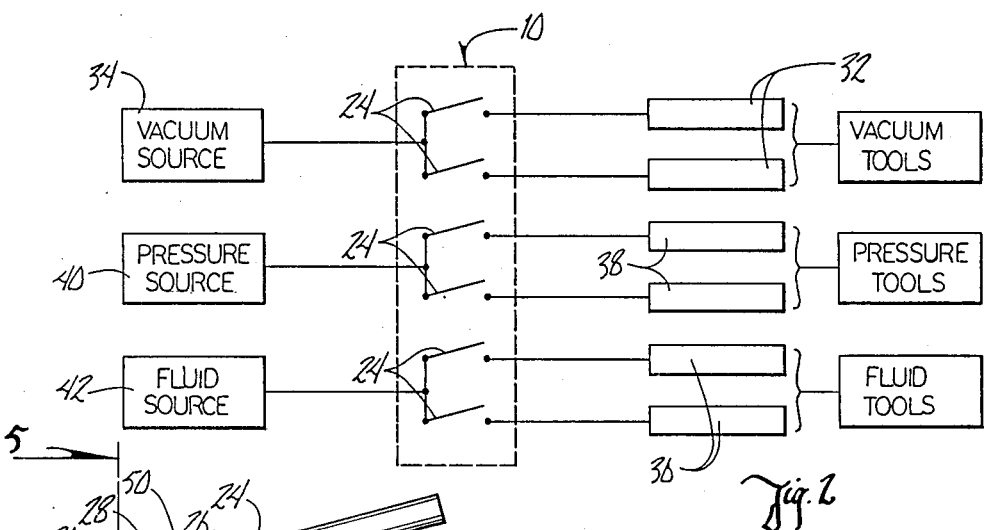
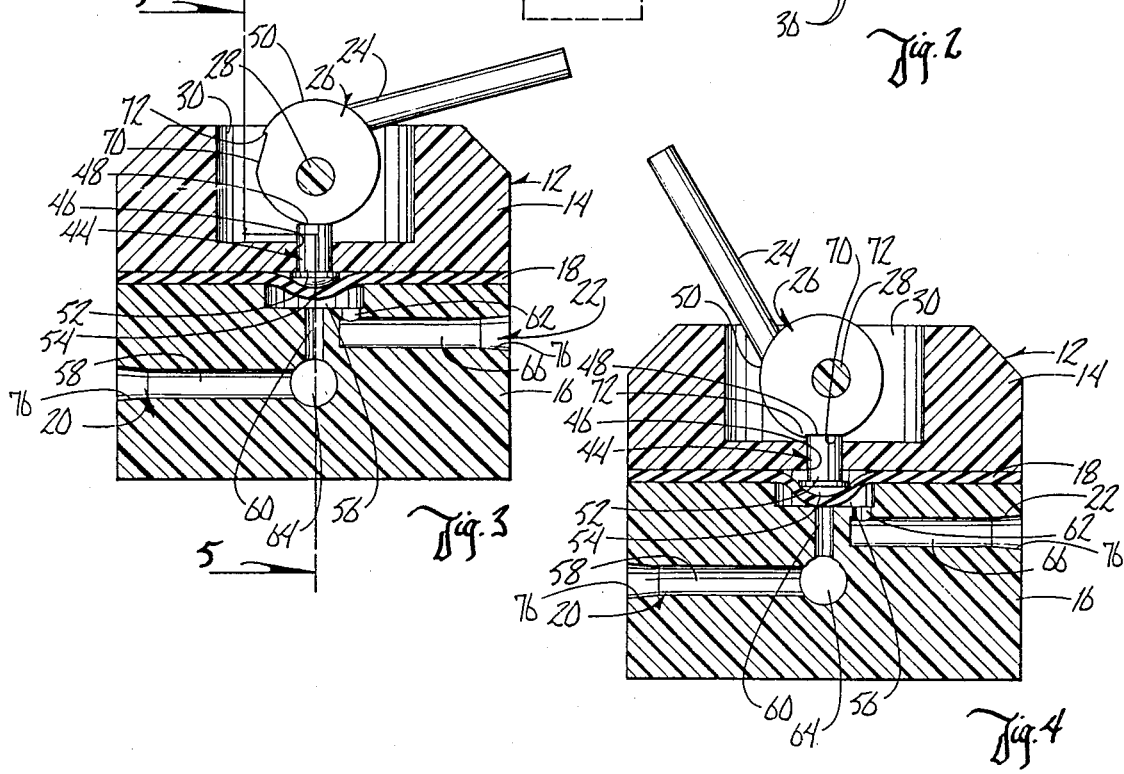

MULTIPLE USE VALVING DEVICE

This is a continuation of co-pending application Ser. No. 781,129 field on Sept. 26, 1985, now abandoned.

BACKGROUND OF THE INVENTION

1. Field of the Invention

The present invention relates to a multi-use valving device, and more particularly to a multi-use valving device for controlling fluid flow, particularly in the field of opthalmic surgery.

2. Problems in the Art

Various means and methods are utilized in the art to control fluid flow. Generally referred to as valves, many are quite costly because of the complexity and number of parts, or the materials they are made from.

The term fluid flow refers to not only liquids, but also to gaseous flow, including both vacuum (sub-atmospheric) and pneumatic pressure (super-atmospheric). For purposes of this application fluid flow also refers to semi-solids and suspended solids.

Generally, valving principles concentrate on means and methods of individually restricting a fluid flow pathway. In some applications, valving action, to a high degree of precision and in an absolute sealing manner, is not necessarily required. However, in many applications, such as pneumatics, vacuum, and sensitive liquids, high precision is essential. It would be most advantageous to have a precision valving device which is economical, reliable, easy to manually control, and flexible to be adapted to many different applications.

There is always a need for a valving means that is easily accessible and operable and is reliable and precise for on-off valving between a fluid flow source and a means uilizing the fluid flow.

A more complex illustrative example of the need for such a valving device exists in the ophthalmic surgery area.

Widespread utilization of micro-surgical instruments and accompanying techniques for ophthalmic surgery is a relatively recent phenomenon and one which is undergoing tremendous technological growth and advance. While new techniques and treatments continue to be explored, perhaps the greatest area of achievement is currently occurring in refining the apparatus utilized in currently accepted procedures.

Previously, ophthalmologists were quite limited in their ability to perform invasive surgery to the human eye because of the damage caused by the coarse incisions and other intrusions made by then-accepted instruments. Currently, ophthalmic micro-surgical instruments have been developed to the point that minimal damage is done to the eye while achieving significant accuracy and safety in completing the various procedures available.

The instruments needed for ophthalmic micro-surgery fall within at least the following classes: cutting instruments; aspiration instruments; and irrigation instruments. This, of course, means that these instruments require various states or forms of fluid flow or energy to operate. For example, some of the currently used cutting instruments utilize electricity for their operation. However, others utilize pneumatic power which requires that pressurized air be delivered to the instrument. Aspirators, of course, require that a vacuum be created in the instrument to enable fluids and solids to be removed. Finally, irrigation instruments require that liquid be supplied through the instrument.

It is also true that for some eye operations, an ophthalmologist will utilize a number of different microsurgical instruments, perhaps even utilizing a number of the same type of instruments for the same operation. Therefore, there is a real and significant need in the art for a multi-use valving device which would allow a surgeon to have, first, multiple instruments (of the same type or of different types) at immediate access, and secondly, manual control over the feedline directly to each instrument.

The current micro-surgical instruments for ophthalmic surgery represent a giant step forward in convenience, efficiency, accuracy, and flexibility for the surgery and the surgeon. A valving device which would allow concurrent operation of multiple instruments from a single pressure, vacuum, or fluid source would further advance the art.

Moreover, because of the very delicate and fragile nature of the eye, sterilization of ophthalmic surgery instruments is critical, perhaps even more so than in other areas of surgery. Therefore, other advances in the art have seen the production and use of disposable micro-surgical instruments, including their connecting tubing. It therefore would be a further advantage to have a valving device which is simple in structure and economical in manufacture so that it too could be disposable.

It is therefore a primary object of the invention to present a multi-use valving device which improves over or solves the problems and deficiencies in the art.

Another object of the invention is to provide a multi-use valving device which allows manual control of a feedline between a fluid flow source and a means utilizing the fluid flow which is simple in structure and reliable in operation.

Another object of the invention is to provide a multi-use valving device which allows multiple pathways from the fluid flow source to be immediately available to the user.

A further object of the invention is to provide a multi-use valving device which can provide a variety of types of fluid flow source and corresponding means utilizing the fluid flow for immediate use to the user.

A further object of the invention is to provide a multi-use valving device which utilizes a positive action, fail-safe mechanical valving which is proximally and manually controllable by the user.

Another object of the invention is to provide a multi-use valving device which is simple and economical to manufacture and assemble, is simple to connect to existing fluid flow systems, and is simple to operate.

Another object of the invention is to provide a multi-use valving device which can be manufactured and assembled at an economical cost so that it may be disposable.

These and other objects, features, and advantages of the invention will become apparent with reference to accompanying drawings and specification.

SUMMARY OF THE INVENTION

The present invention utilizes a deformable, but resilient sealing member in association with a actuator means, controlled by a manual control member, to either allow fluid transmission through a channel between the inlet and outlet of the valve device, or to deform the sealing member to interpose it in the channel to seal off any fluid transmission therethrough. In otherwords the resilient seal or gasket simultaneously performs functions as a switch, as a sealer and as a yieldable spring. The manual control member is manually moveable between an open and closed position. By moving the manual control member to the closed position, the actuator is mechanically moved against the sealing means to deform it sufficiently to seal off the fluid transmission channel. By returning the manual control member to the open position, the actuator is freed and the inherent resilience of the sealing member forces it away thereby opening the fluid transmission channel.

The invention can advantageously be used in a number of different embodiments. A simple embodiment could contain one manual control member with one fluid transmission channel connecting one inlet and outlet. More complex combinations can also be created such as a single inlet with a plurality of fluid transmission channels to a plurality of corresponding outlets, each channel having a corresponding manual control member and actuator means. Such an arrangement allows use of one fluid flow source for a plurality of means utilizing that single fluid flow source.

Furthermore, other combinations such as two inlets each connected to a different fluid flow source, and each with a respective plurality of channels to corresponding outlets, may be utilized. Each channel can have its own on/off capability to allow consecutive selection of various means utilizing the fluid flow, or to allow concurrent use of those different means. For whatever purpose, it is also conceivable that a plurality of inputs can be utilized for a single output.

The particular method of valving, utilizing the deformable yet resilient sealing member, allows the invention to not only have a semi-automatic release from the closed position (made possible by the resiliency of the sealing member) but also allows one unitary piece of sealing material to be utilized and positioned in the valve housing to facilitate and and all of the valving actions therein.

The invention is also capable of including with the manual control member a means for a positively locking the manual control member in the closed position until manual release so that the user does not have to hold the manual control member in the closed position.

The simplicity of structure, operation, and assembly, along with the ability to make the invention from economical materials and parts, allows the multi-use valving device to be disposable.

BRIEF DISCRIPTION OF THE DRAWINGS

FIG. 1 is a perspective view of a preferred embodiment of the invention showing potential attachments schematically.

FIG. 2 is a schematic showing the invention attached to a variety of inputs and outputs.

FIG. 3 is a sectional view of the invention taken along lines 3—3 of FIG. 1 showing one particular valve in an open position.

FIG. 4 is the sectional view of FIG. 3 showing the valve in a closed position.

DETAILED DESCRIPTION OF THE PREFERRED EMBODIMENT

Figure 5:
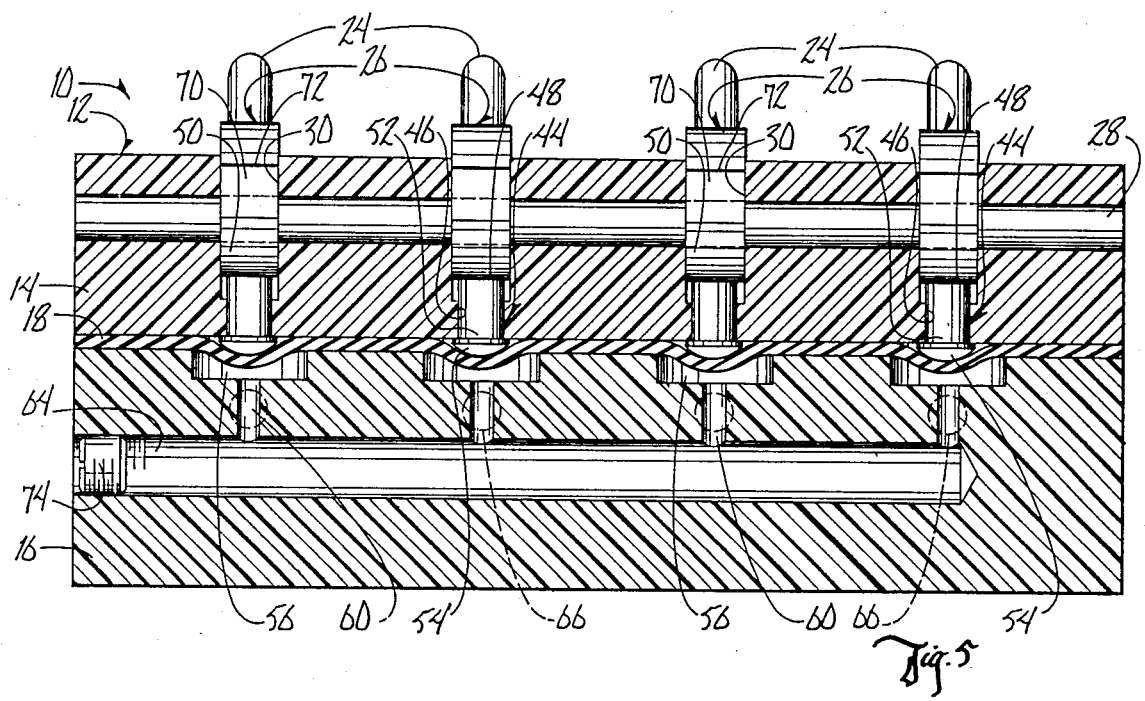
FIG. 5 is a sectional view taken along lines 5—5 of FIG. 3.

With reference to the drawings, and particularly FIG. 1, the invention 10, a Multiple Use Valving Device is shown. The primary and preferred field of use of the inventionis with respect to ophthmalic surgery procedures.

The invention 10 includes a valve body 12 comprised of an upper portion 14, a lower portion 16 and a deformable, resilient, sealing member 18 disposed therebetween.

Valve body 12 also includes an inlet port 20, and in the embodiment of FIG. 1, four outlet ports 22 (not shown, see FIG. 5).

Corresponding to each outlet port 22 is a manually controllable lever or switch 24 rigidly connected to an eccentric disk 26 which in turn is rotatable around an axle 28 extending through upper portion 14 of valve body 12. Eccentric disks 26 are recessed within corresponding slots 30 in upper portion 14 of valve body 12.

The embodiment of FIG. 1 functions as follows. Four individual ophthalmic micro-surgery tools 32, which utilize and/or operate by vacuum, are operatively connected to the four outlet ports 22 in valve body 12. A vacuum source 34 is operatively connected to inlet port 20 in valve body 12. Each of the switches 24 thus functions, according to desire, to allow manual control by the ophthalmic surgeon of valving of the vacuum from vacuum source 34 to selected tools 32. In essence, the surgeon can allow all tools 32 to receive vacuum, or only selected ones. Furthermore, vacuum can be blocked from all or only selected tools 32. The surgeon thus has a reliable, simple way in which to have a plurality of ophthalmic micro-surgery tools instantly available for use.

FIG. 2 is a schematic representation of one of many alternative variations of the invention. Ophthalmic surgery at times requires at least the three different types of tools shown. Vacuum tools 32 include what in the art are called aspirators which are needed to evacuate the eye of various fluids and solids. Fluid tools 36 are known in the art as irrigation tools and are used to supply various fluids to the eye. Pressure tools 38 generally are cutting instruments powered by pneumatic pressure such as reciprocating cutters and the like. As can be seen in FIG. 2, the multiple-use valving device 10 according to the invention can operate with any of the states of vacuum source 34, pressure source 40, and fluid source 42. FIG. 2 schematically depicts the example of two tools being available for each different source, and each tool having a separate on/off switch 24. It is to be readily understood that any number of tools and switches can be used for each source. In the embodiment of FIG. 2, the surgeon would have readily accessible manual control over a variety of different types of tools.

FIGS. 3 and 4 depict the specific structure of the preferred embodiment of the invention of FIG. 1 and the manner in which each valving switch operates. A piston 44 is slideably positioned within a bore 46 within upper portion 14 of valve body 12 and is positioned so that its upper end 48 abuts the perimetric edge 50 of eccentric disk 26. Thus, according to the rotation of eccentric disk 26, piston 44 is forced downward.

The lower end 52 of piston 44 includes a flared convex head 54 of a larger diameter than the body of piston 44. As can be seen, convex head 54 abuts the upper surface of sealing member 18, which, in the preferred embodiment, extends throughout the interfacing area between upper and lower portions 14 and 16.

A receptacle bore 56 exists in the top surface of lower portion 16 of valve body 12 and is in direct alignment with convex head 54 and piston 44. Receptacle bore 56 is directly adjacent to the lower surface of sealing member 18.

Both input port 20 and output port 22 fluidly communicate with receptacle bore 56. Input port 20 does so by horizontal input bore 58 which is in turn communicated with vertical input bore 60 which directly communicates with receptacle bore 56. It is to be understood that horizontal input bore 58 also communicates with common input bore 64 (seen on end in FIGS. 3 and 4) which distributes either vacuum to each and every receptacle 56 according to the number of valving switches utilized. In the embodiment of FIG. 1 common input bore 64 would distribute vacuum to each of the four receptacle bores 56.

Each output port 22 communicates with its respective receptacle bore 56 by first a horizontal output bore 66 and then a vertical bore 62 directly into receptacle bore 56.

FIG. 3 shows a switch 24 and the corresponding valving channels in an open position. Switch 24 is turned to the right most extreme, which positions the smallest radius of eccentric disk 26 with respect to the upper end 48 of piston 44. The inherent resiliency of sealing member 18 forces piston 44 upward against the edge of eccentric disk 26, which allows a clear pathway between inlet port 20 and the respective outlet port 22.

In direct comparison, FIG. 4 illustrates the closing of the pathway between inlet port 20 and the corresponding outlet port 22. When lever or switch 24 is moved to the left hand most extreme position, an increasingly larger radius of eccentric disk 26 is presented to piston 44 which forces it downward. Convex head 54 deforms sealing member 18 in such a manner that sealing member 18 seals off vertical input bore 60 in receptacle bore 56 thereby blocking the pathway between inlet and outlet ports 20 and 22 and closing that valving pathway.

It is particularly pointed out, that in the preferred embodiment, each eccentric disk 26 has a flattened section 70, and a corresponding step 72 along its perimetric edge which are positioned to correspond with a "closed" position for switch 24 and which serve to function as an automatic stop and hold feature for each switch 24. As shown in FIGS. 3 and 4, when switch 24 is moved to the left, upper end 48 of piston 44 follows perimetric edge 50 until it abutts against step 72 and flattened section 70. Step 72 prevents any further counterclockwise revolution of eccentric disk 26, while flattened section 70 mates with the horizontal upper edge 48 of piston 44 to hold level 24 in that position against the upward force of resilient sealing member 18 so that the pathway can be closed and left that way without the surgeon holding the lever in that position. By moving lever 24 to the right until upper end 48 of piston 44 is removed from flattened section 70, the resiliency of sealing member 18 assists in unblocking the pathway and allowing it to remain open, again without the surgeon holding lever 24 to the right.

FIG. 5 shows how the common input bore 64 distributes fluid flow (vacuum) between inlet port 20 and each of the four switches 24 and receptacle bores 56 of the embodiment of FIGS. 1, 3, and 4. It is to be understood that the left hand end of common input bore 64 contains a sealed plug 74 or any other sealing means. Because sealing member 18 extends throughout the interface between upper and lower portions 14 and 16, no leakage can occur from the bored pathways in lower portion 16. The unitary sealing member 18 obviates the need for individual valve seals and, as explained above, functions to assist in holding levers 24 in an open position.

Figure 6:
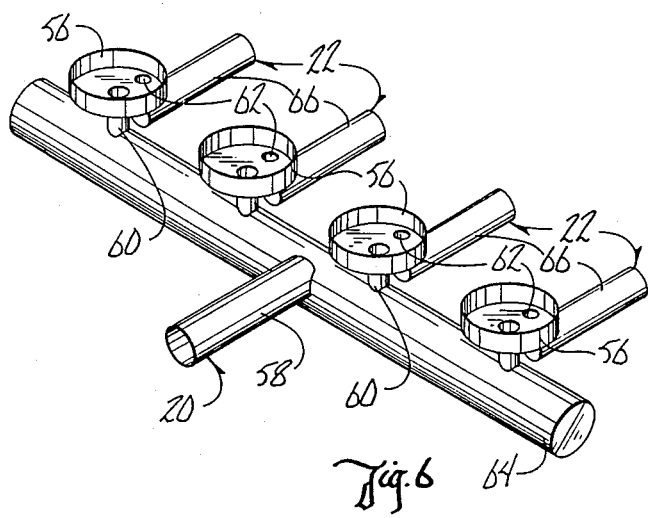
FIG. 6 is a perspective representation of the bores comprising the air channels of the embodiment of FIG. 1.

FIG. 6, for further clarification, illustrates in perspective the bores comprising the fluid pathways of the embodiment of FIGS. 1, 3, 4 and 5. It can be seen that the arrangement of the various bores allows for easy machining to reduce manufacturing costs.

The operation of the invention has been discussed previously. It is to be understood that the invention can be utilized with any number of outlet ports 22 and corresponding switches 24. Likewise, any combinations of sources, inlets, and outlets, such as shown in FIG. 2, can be utilized. Additionally, it is to be understood that the valve could contain only a single inlet port 20 and a corresponding single outlet port 22 with a single switch 24, piston 44, and receptacle bore 56. FIGS. 3 and 4 would show such a configuration if common input bore 64 were removed.

The valves can be used singly, in series, or in parallel. It is even possible to attach a bar across two or more of levers 24 which are in parallel (such as in FIG. 1) to allow a surgeon to simultaneously close and open two or more switches without individually operating each.

In the preferred embodiment, the valve body can be made of any suitable material as is known in the art. Examples are polysulphone, polycarbonate and SANS, ABS, or "K-resin" ®. It is preferred that the valve body be molded and be sterilizable by radiation. The positive sealing action and the confinement of fluid passage to the lower portion 16 of valve body 12 eliminates any leaking problems and allows economical materials to be utilized.

Sealing member 18 can be made of any deformable yet resilient sealing material. Silicone is preferred if the valve is going to be in repeated use, whereas latex is preferred if it is a one time only, disposable component. Natural rubber, die cut to fit, could also be utilized.

It is further understood that if the valving channels are utilized to communicate liquids, filters such as are known in the art could be utilized in association with outlet ports 22 to prevent any backflush from occurring in the transition between open and closed.

Assembly of the invention 10, particularly upper portion 14 to lower portion 16 can be accomplished by any means known within the art. Screws or bolts could be utilized to securely attach the two with sealing member 18 in between. Alternatively, pins extending from upper portion 14 into apertures in lower portion 16 and through holes in sealing member 18 could be ultrasonically welded thereby securing valve body 12 together. Any known method of connecting vacuum sources, pressure sources, or fluid sources and respective tools to valve body 12 can be utilized. It is preferred that inlet and outlet ports 20 and 22 have standard lure tapers 76 as shown in FIGS. 3 and 4.

It will be appreciated that the present invention can take many forms and embodiments. The true essence and spirit of this invention are defined in the appended claims, and it is not intended that the embodiment of the invention presented herein should limit the scope thereof.

What is claimed is:

1. A multiple use valving device for use in an ophthalmic micro-surgery system between at least one fluid flow source and at least one ophthalmic microsurgery instrument utilizing the fluid flow, said fluid flow being selected from but not limited to the set of pressurized gas, liquid and vacuum, comprising:

a valve housing having at least one inlet opening each connectable to a fluid flow source, an outlet opening connectable to each said ophtalmic microsurgery instrument utilizing the fluid flow, and a channel connecting each said inlet and each correponding said outlet opening;

a deformable but resilient sealing member positioned within said valve housing, moveable between a first position outside of each said channel and a second position interposed into each said channel for sealingly blocking said channel from any fluid communication between each said inlet and the corresponding said outlet opening;

a manual control member for each said channel, having an open position and a closed position, operably attached to said valve housing for selectively and manually controlling movement of said sealing member between said first and second positions for the corresponding said channel, said manual control member including an eccentric cam pivotable about an axle which is secured to the valve housing, said eccentric cam having a generally curved periphery except for a flattened portion terminating in a raised stop, said flattened portion and raised stop corresponding with the closed position of the manual control member;

an actuator means being responsive to each said manual control member and positioned within said valve housing to abutt and deform said sealing member into said second position when said manual control member is placed in said closed position, and being responsive to the resiliency of said sealing member to be pushed away from said channel when said manual control member is in said open position so that said sealing member is in its said first position, said actuator means following the periphery of the manual control member until reaching the flattened portion and stop, the flattened portion causing the actuator means to be locked in a position whereby it deforms said sealing member into said second position, the stop disallowing any further movement of the manual control member towards the closed position; and the actuator means including a stem having a first end which abutts the manual control member, the stem extending through an aperature in the valve housing to a second end which abutts the sealing member, the second end having a head portion which is greater in diameter then the stem and which has an outermost rounded surface which contacts the sealing member and facilitates the sealing action of the sealing member into the channel.

2. The device of claim 1 wherein each said manual control member includes means for automatically holding said sealing means in said first position when said manual control means is moved to said closed position.

3. The device of claim 1 wherein said sealing member is elastomeric.

4. The device of claim 1 wherein said valve housing comprises a first portion containing said manual control members and said actuator means, a second portion containing said inlet and outlet openings and said channels, said first and second portions being secured together with said sealing member disposed therebetween.

5. The device of claim 1 further comprising a plurality of outlet openings, each outlet opening being in fluid communication with a common inlet channel which in turn is in fluid communication with said inlet opening.

6. The device of claim 1 wherein each said channel includes a sealing member receptacle to provide for a complete seal between said sealing member and said channel, said sealing member receptacle comprising a horizontally disposed bore with said channel from said inlet opening entering vertically from beneath said sealing member receptacle.

7. The device of claim 6 wherein said second end of said actuator means further comprises an enlarged portion to mateably correspond with said sealing member receptacle.

8. The device of claim 1 further comprising a plurality of outlets each having a corresponding said channel in fluid communication between said inlet and each said outlet, and each having a corresponding manual control member and actuator.

9. The device of claim 1 wherein there are two inlets and at least one outlet with a said channel therebetween for each inlet with a manual control member and actuator meansfor each channel between each said inlet and each said outlet.

10. The device of claim 1 wherein said fluid flow source comprises a vacuum source and said means utilizing said vacuum source comprise instruments utilizing vacuum.

11. The device of claim 1 wherein said fluid flow source comprises a pressurized gas source and said means utilizing said pressurized gas comprise instruments utilizing pressurized gas.

12. The device of claim 1 wherein said fluid flow source comprises a liquid source and said means utilizing said liquid comprise instruments utilizing liquid.

13. A multiple use valving device for use in an ophthalmic micro-surgery system between at least one fluid flow source and at least one ophthalmic microsurgery instrument utilizing the fluid flow, said fluid flow being selected from but not limited to the set of pressurized gas, liquid and vacuum, comprising:

a valve housing having at least one inlet opening each connectable to a fluid flow source, an outlet opening connectable to each said ophthalmic microsurgery instrument utilizing the fluid flow, and a channel connecting each said inlet and each corresponding said outlet opening;

a deformable but resilient sealing member positioned within said valve housing, moveable between a first position outside of each said channel and a second position interposed into each said channel for sealingly blocking said channel from any fluid communication between each said inlet and the corresponding said outlet opening;

a manual control member for each said channel, having an open position and a closed position, operably attached to said valve housing for selectively and manually controlling movement of said sealing member between said first and second positions for the corresponding said channel, said manual control member including an eccentric cam pivotable about an axle which is secured to the valve housing, said eccentric cam having a generally curved periphery except for a flattened portion terminating in a raised stop, said flattened portion and raised stop corresponding with the closed position of the manual control member; and an actuator means being responsive to each said manual control member and positioned within said valve housing to abutt and deform said sealing member into said second position when said manual control member is placed in said closed position, and being responsive to the resiliency of said sealing member to be pushed away from said channel when said manual control member is in said open position so that said sealing member is in its said first position, said actuator means following the periphery of the manual control member until reaching the flattened portion and stop, the flattened portion causing the actuator means to be locked in a position whereby it deforms said sealing member into said second position, the stop disallowing any further movement of the manual control member towards the closed position.

* * * * *